US 6,425,279 B1

(12) United States Patent
Jeffries

(10) Patent No.: US 6,425,279 B1
(45) Date of Patent: Jul. 30, 2002

(54) METHOD OF MANUFACTURING GAS SPRINGS

(75) Inventor: Mark S. Jeffries, Florence, SC (US)

(73) Assignee: AVM, Inc., Marion, SC (US)

( * ) Notice: Subject to any disclaimer, the term of this patent is extended or adjusted under 35 U.S.C. 154(b) by 0 days.

(21) Appl. No.: 09/744,287

(22) PCT Filed: Aug. 20, 1999

(86) PCT No.: PCT/US99/19022
§ 371 (c)(1),
(2), (4) Date: Apr. 2, 2001

(87) PCT Pub. No.: WO00/10742
PCT Pub. Date: Mar. 2, 2000

Related U.S. Application Data

(60) Provisional application No. 60/097,480, filed on Aug. 21, 1998.

(51) Int. Cl.$^7$ ................................. B21D 15/02
(52) U.S. Cl. ...................... 72/370.21; 72/52; 267/64.15
(58) Field of Search ............................... 72/370.21, 52; 267/64.12, 64.15; 91/400; 92/85 B, 143; 188/322.19, 284; 29/896.9, 896.93

(56) References Cited

U.S. PATENT DOCUMENTS

| 4,066,279 A | * | 1/1978 | Kaptanis |
| 4,078,638 A | * | 3/1978 | Koyama et al. |
| 4,595,182 A | * | 6/1986 | Freitag |
| 5,702,091 A | * | 12/1997 | Perrin et al. |

* cited by examiner

Primary Examiner—P. W. Echols
(74) Attorney, Agent, or Firm—McAndrews, Held & Malloy, Ltd.

(57) ABSTRACT

The method includes making a fluid communication channel (44), which has a selectively variable cross-sectional area profile, in the inner face of a gas spring cylinder (32) so as to permit fluid communication at different selective rates bypassing around or across the piston assembly (68) of the gas spring (52) as the piston assembly (68) moves within the cylinder (32). Preferably the cross-sectional area profile of the fluid communication channel (44) is initially substantially the same throughout the length of the channel(44) and is thereafter selectively changed in certain portions of the channel (44) so as to restrict and in some instances block gas or fluid flow through the fluid communication channel (44).

22 Claims, 4 Drawing Sheets

METHOD OF MANUFACTURING GAS SPRINGS

CROSS REFERENCE TO RELATED APPLICATIONS

The present application is based on, and claims priority from, U.S. provisional application Ser. No. 60/097,480, filed Aug. 21, 1998, titled "Improved Double Stop Dynamic Gas Spring", which provisional application is incorporated herein, in its entirety, by reference.

BACKGROUND OF THE INVENTION

The present invention relates to an improved method of manufacturing gas springs, and more particularly, to an improved method of efficiently and inexpensively manufacturing a gas spring where the gas spring cylinder has an axial, fluid communication channel through which gas (fluid) may be bypassed around or across the gas spring piston assembly and which has a preselected cross-sectional area profile so as to provide the gas spring with predetermined operating characteristics.

Gas springs have been used in many fields, including the automotive field where they have been employed to facilitate and control the movement of hatches, lids and liftgates. Generally speaking, gas springs include, among other components: a cylinder that defines an internal tubular cavity; a piston assembly reciprocally moveable within and dividing the tubular cavity into compression and extension working chambers; a shaft connected and moveable with the piston assembly, with one end of the shaft projecting out of an end of the tubular cavity; and: end caps for closing the ends of the tubular cavity, with one of the end caps also including a seal for the reciprocally moveable shaft as it moves with respect to that end cap.

In normal gas spring operation, the piston assembly, and its projecting shaft, may extend or retract at a nominal rate due to the metering of the gas across the piston assembly. Various structures, including control-flow orifices in the piston assembly and channels or grooves in the inner face of the cylinder, have been utilized in the past to meter or control the passage of gas between the working chambers across the piston assembly as the piston assembly moves within the tubular cavity.

In some applications, the shaft may be decelerated during the extension stroke of the gas spring, and before the shaft is extended fully and stops by including a higher viscosity fluid in the tubular cavity. This fluid causes the piston assembly to slow incrementally and thus provides a "cushioned" stop. This higher viscosity fluid, end-of-travel damping technique is, however, orientation sensitive. The gas spring must be in a shaft-down orientation through its extension stroke or else the higher viscosity fluid will meter through the piston assembly prematurely, and the end-of-travel damping feature is lost.

In many automotive environments (for instance, when gas springs are used with hatchbacks), this required shaft-down orientation cannot be maintained. Hence, this end-of-travel damping feature has been unavailable in such "flip over" automotive environments without significant component additions that cause the price of the gas springs to be increased significantly.

As noted, channels or grooves have been provided in the inner face of gas spring cylinders to interconnect the gas springs' two working chambers. U.S. Pat. Nos. 4,643,011 and 4,866,966, issued Feb. 17, 1987, and Sep. 19, 1989, respectively, discloses such axial cylinder channel or grooves. These channels or grooves, are relatively expensive to provide because their manufacture requires specialized, relatively sophisticated tooling and manufacturing operations separate and apart from the manufacture of the cylinder itself.

SUMMARY OF THE INVENTION

It is a primary object of the present invention to provide an improved method for manufacturing gas springs where the gas spring cylinder includes an axial, fluid communication channel that interconnects the two working chambers in the gas spring and that serves as a flow path (orifice), between the two working chambers, across or a bypass around the gas spring piston assembly. Preferably, the fluid communication channel initially extends continuously between the ends of the cylinder and includes a uniform, initial cross-sectional area profile. Thereafter, the initial cross-sectional area profile of one or more of the channel portions is selectively changed or varied, relative to the initial profile of the other channel portions, so that the selectively changed cross-sectional area profile(s) will provide the gas spring with desired operating characteristics. The manufacturing method of the present invention is particularly suited for the efficient, relatively inexpensive mass production manufacture of gas spring cylinders, and thus gas springs, using conventional tooling while still permitting customization or selective designing of the gas spring's operating characteristics for a variety of different applications.

More specifically, a fluid communication channel is preferably initially made in the cylinder at the time that the cylinder itself is made with the entire length of the continuous channel having a uniform or the same, initial cross-sectional area profile. After the cylinder is cut to the desired length for the contemplated gas spring, one or more selected portions of the channel then have their initial, cross-sectional area profile changed. This change in the cross-sectional area profile causes preselected changes in the rates of flow of gas through the channel and bypassed around or across the piston assembly. This results in the gas spring having predetermined, desirable operating characteristics.

The change in the initial cross-sectional area profile of one or more portions of the channel may be accomplished in a variety of ways. Preferably the profile of a channel portion is reduced by applying external force or pressure to the outer face of the cylinder, adjacent to and oriented radially aligned and opposed to the selected channel portion, so as to reduce the profile and thereby restrict, relative to adjacent channel portions, the flow of gas through the changed portion.

In an application, it may be beneficial that the gas spring shaft should come to an intermediate stop (that is, a stop before its normal end-of-stroke stop). The portion of the channel, adjacent to where the piston assembly is to come to such an intermediate stop, will then be changed or "crushed" so as that its cross-sectional profile area is reduced to approaching zero (that is, exhausted) and so that the portion will be left with a smooth, rounded surface, which corresponds with the rest of the inner face of the cylinder.

Similarly, when it is desired that the piston assembly, and thus the gas spring shaft, decelerate before reaching a stop, the cross-sectional area profile in the channel portion, immediately preceding the stop, may be reduced, relative to the cross-sectional area profiles of the channel portion(s) before (or upstream) of the stop. This channel profile change (reduction) proportionally reduces in the velocity of the gas spring's shaft's rate of movement through the reduced cross-sectional area profile portion. Hence, the use of the fluid communication channels, made according to the present invention, eliminates the requirement that a gas spring be disposed in a shaft-down orientation to have a desired deceleration of the piston assembly and shaft before stopping.

Another object of the present invention. is to provide an improved, efficient, relatively inexpensive method of manufacturing gas springs of the type described comprising the steps of: making a fluid communication channel in the inner face of the cylinder, where the fluid communication channel has an initial, predetermined cross-sectional area profile, is open to the tubular cavity and extends axially in the inner face so that the fluid communication channel may provide a path for the flow of fluid between the first and second working chambers and for bypassing around or across the piston assembly as the piston assembly reciprocally moves within the tubular cavity; and changing selectively the initial cross-sectional area profile of at least a portion of the fluid communication channel so that the rate of flow of gas or fluid through the fluid communication channel and bypassed around or across the piston assembly, when the piston assembly is adjacent to the channel portion, is selectively changed as compared to the rates of flow of fluid through the fluid communication channel and bypassed around or across the piston assembly when the piston assembly is adjacent to other channel portions that have different cross-sectional area profiles. A related object of the present invention is to provide an improved method, as described, where the fluid communication channel is made as the cylinder is being made; where the fluid communication channel is made so as to extend continuously between the ends of the cylinder; where the initial cross-sectional area profile of the fluid communication channel is substantially the same throughout the fluid communication channel, where the initial cross-sectional area profile of more than one portion of the fluid communication channel is selectively changed; and where channel making means are used to make the fluid communication channel. Another related object of the present invention is to provide an improved method, as described, where changing the initial cross-sectional area profile of the channel portion includes the step of exerting selective forces on the outer face of the cylinder, adjacent to the channel portion, so as to reduce the initial cross-sectional area profile of the channel portion, relative to the initial cross-sectional area profiles of other portions of the fluid communication channel. Still another related object of the present invention is to provide an improved method, as described, where the initial cross-sectional area profile of the channel portion is reduced to approaching zero so that gas or fluid is prevented from flowing through the channel portion and bypassing around or across the piston assembly when the piston assembly is disposed adjacent to the channel portion.

A still further object of the present invention is to provide an improved gas spring manufactured by the improved method as described.

These and other objects, benefits and advantages of the present invention will be more apparent from the following description of the drawings and the preferred embodiments of the present invention.

DETAILED DESCRIPTION OF THE PREFERRED EMBODIMENTS OF THE INVENTION

Figure 1:
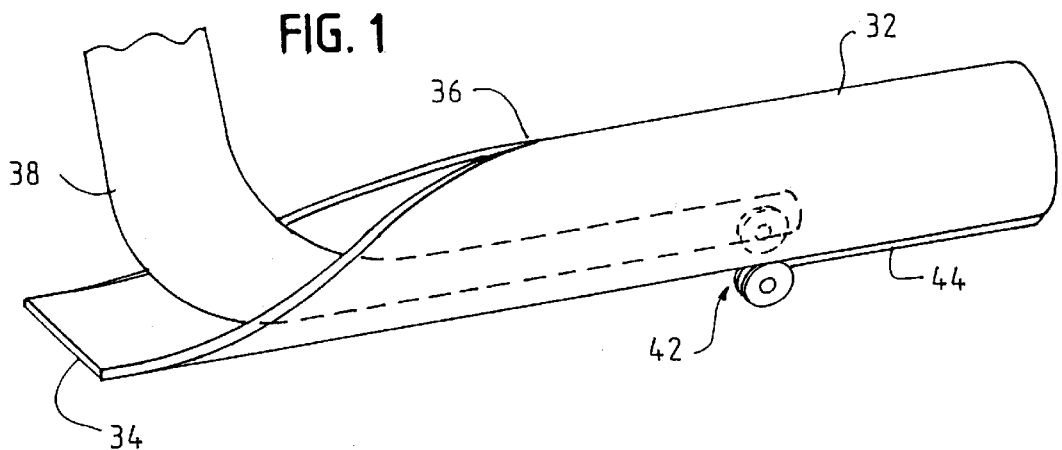
FIG. 1 is a general perspective view illustrating a method of manufacturing tubing or a cylinder in which an axial fluid communication channel, which has an initial cross-sectional area profile, is being made while the cylinder is being manufactured.
Figure 2:
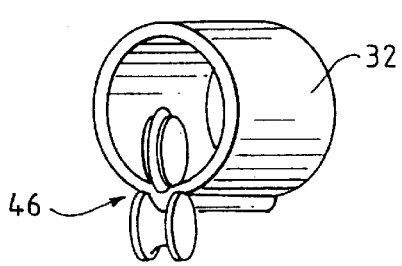
FIG. 2 is a general perspective view illustrating one type of tooling that may be used for making the fluid communication channel of FIG. 1.

FIG. 1 generally illustrates a conventional method of manufacturing a continuous tubular cylinder 32 that may be cut into appropriate lengths and used as cylinders for gas springs. More specifically, the cylinder 32 is made by a conventional process from conventional metal roll strip stock, indicated at 34, which is formed, in a conventional manner, into a continuous tubular cylinder 32. The abutted side edges of the roll strip stock 34 are seamed or welded together at 36, in a conventional manner, by conventional welding equipment, not shown, to form the cylinder 32.

A conventional mandril shown generally at 38, is introduced into the newly forming cylinder 32, downstream from the point of side edge seaming, and supports tooling, indicated generally at 42, for making a continuous axial, fluid communication channel or groove 44 in the inner face or ID of the cylinder.

The channel 44 may, however, be posited into the inner face of the cylinder by the use in any number of different conventional ways. Preferably, whatever way is employed, the channel 44 should have a uniform cross-sectional area profile throughout its length, and the longitudinal axis of the channel 44 should be substantially parallel to the longitudinal axis of the cylinder 32.

Figure 3:
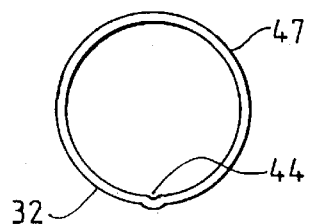
FIG. 3 is an end view of the cylinder being made in FIG. 1.

As illustrative of the tooling that may be used with the method illustrated in FIG. 1, a conventional matched and mated roller assembly 46 is mounted, in part on the mandril 38 and is forced in contact, in a conventional manner, with both the inner face and outer face or OD of the cylinder 32 at a point downstream form where the side edges of the roll strip stock are seamed to form the cylinder. (Structure, not shown, supports the part of the tooling 46 that contacts the outer face of the cylinder.) The use of the tooling 46 may leave a ridge, which is visible on the outer face of the cylinder and which is generally the inverse equivalent of the profile of the channel 44. FIG. 3 shows (downstream from the tooling 46) a channel 44 as would be made by the tooling 46, that is, made with a ridge visible on the outer face of the cylinder wall 47.

Figure 4:
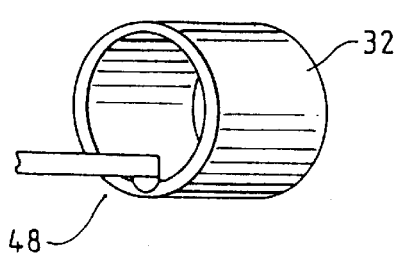
FIG. 4 is a general perspective view illustrating other tooling that may be used to make the fluid communication channel of FIG. 1.
Figure 5:
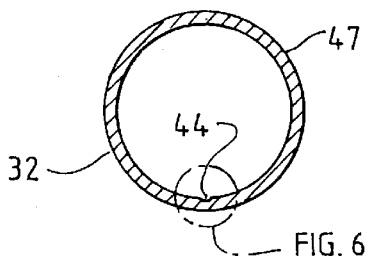
FIG. 5 is a axial, end cross-sectional view of the cylinder of FIG. 1 (taken downstream from the channel forming tool) and showing a fluid communication channel of FIG. 1.
Figure 6:
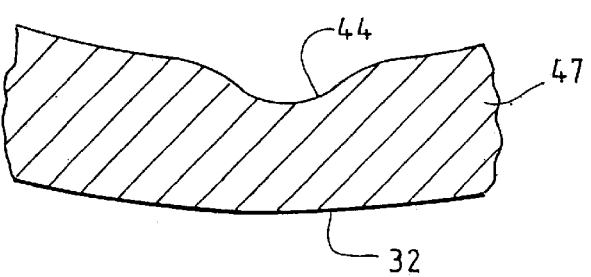
FIG. 6 is an enlarged view of the portion of the channel taken on line 6 in FIG. 5.

Another example of channel making tooling is indicated at 48 in FIG. 4. The conventional tooling 48 removes or "cuts" metal from the inner face of the cylinder 32 to make the channel 44, and leaves the outer face of the cylinder 32 undisturbed and cylindrical. FIGS. 5 and 6 illustrates a channel 44 made by the tooling 48. In this regard, the tooling 48 functions in a manner similar to a conventional weld flash skiving tool, which is used to remove the weld flash.

In the manufacture of a tubular cylinder for use as gas spring cylinders, and after the tubular cylinder has been "rolled", from roll stock, and welded, it is typical for the tubular cylinder to be taken to conventional draw bench (not shown) for conventional cold processing. At the draw bench, the tubular cylinder may be drawn, in a conventional manner, through a reducing die which "shrinks" the OD of the cylinder and elongates the tubular cylinder. The tubular cylinder may also be expanded by drawing an internal mandrill through the cylinder. The channel 44 could be made or grooved during one or both of the drawing phases of the cylinder manufacturing processes. For instance, the internal mandril may have a radial projection that may draw or skive the continuous channel 44.

While many different types of conventional tooling may be used to make the channel 44, it is important to note that significant manufacturing economies may be achieved by continuously making the channel 44 in the cylinder, during the cylinder manufacturing process or cycle, as compared to using custom tooling to make the channel, after the cylinder has been cut to length for a gas spring. It should also be noted that, of course, any number of channels 44 may be made in the inner face of the cylinder 32. Similarly the channel(s) 44 may have a variety of different cross-sectional area profiles. Rather the shape and size of the channel may vary depending on the specific application for the resulting gas spring.

After the cylinder 32, with at least one fluid communication channel 44, is made, the cylinder is then cut to length and prepared for assembly as part of a gas spring. The ends of the cut cylinder may be bored appropriately to exhaust the channels, at the ends, and to provide smooth mating surfaces to receive end caps and the conventional O-ring seal associated with the shaft-end cap.

Figure 7:
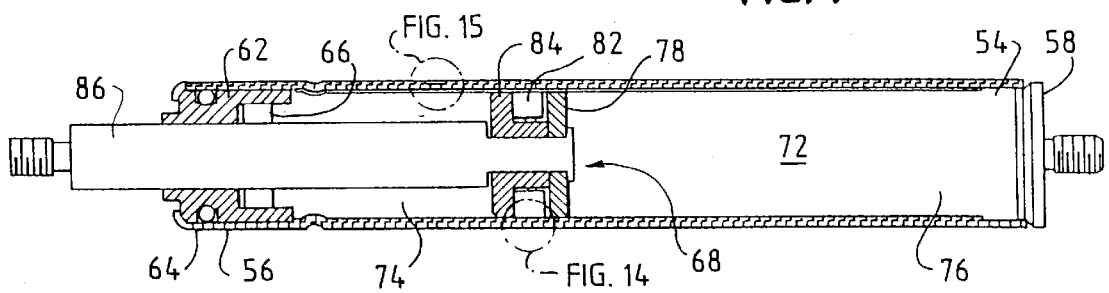
FIG. 7 is an axial, cross-sectional view of a gas spring made in accordance with the present invention.

More specifically, the exemplary gas spring 52, shown in FIG. 7, is made from such a cut piece cylinder 32. The compression and extension ends 54 and 56 of the cylinder have been bored so that the ends of the channel 44, adjacent to the ends 54 and 56, are removed. (Notwithstanding this, the channel 44 continues to extend through the entire, functional length of the cylinder 32.)

A conventional end cap 58 is welded, in a conventional manner, to the compression end 54 of the cylinder. A conventional end cap 62 is disposed and secured. in a conventional manner, in the extension end 56 of the cylinder. A conventional O-ring seal 64 and a conventional shaft seal 66 are included as parts of the cap 62.

A conventional piston assembly 68 is disposed within the cylinder 32. More particularly, the inner surface of the cylinder and the caps 58 and 62 define an interior tubular cavity 72 within the cylinder. The piston assembly 68 divides the cavity 72 into a working chamber 74 and a working chamber 76.

The piston assembly 68 includes conventional components, including a bypass valve 78, a sealing ring 82 and a top plate 84. The assembly is axially, reciprocally movable—in a compression stroke or in an extension stroke—within the cavity 72. A shaft 86 is connected with the assembly 68 and projects or extends axially out of the cavity 72, through the cap 62, in a conventional manner.

As is conventional, the sealing ring 82 of the piston assembly 68 is permitted to shuttle a certain distance between the valve 78 and the top plate 84. During the compression stroke, the sealing ring 82 shifts against the top plate 84 and a free flow of gas across the assembly 68 commences, as the valve permits the free or substantially unimpeded bypass of gas around the piston assembly 68 in the conventional manner. This, for instance. allows an automotive hatch or lid to be shut quickly and without being dampened by the metering of the gas through the channel 44.

During the extension stroke, the sealing ring 82 shuttles against the valve 78 and seals off all of the bypass openings. This leaves the channel 44 as the only interconnection around or across the assembly 68 and between the chambers 74 and 76.

As the piston assembly 68 continues to move axially within the cylinder 32 during its extension stroke, its outer peripheral surface, and particularly the sealing ring 82, mate with the inner face of the cylinder and correspondingly seals all points of contact therebetween, except for the channel 44, which, as noted, interconnects the chambers 74 and 76. Controlled, preselected metering of the gas through the channel 44 from chamber 74 to chamber 76 may be achieved by changing, or more specifically, reducing the initial cross-sectional area profile of the channel in preselected portions or parts of the channels. Such channel profile changes will permit dynamic dampening and/or intermediate stoppage of the piston assembly 68. Channel profile changes or reductions may be accomplished by urging or "crushing" the material, which comprises the cylinder wall 47, to flow or move into the channel 44 thereby reducing the channel's cross-sectional area profile by a desired, predetermined amount.

Figure 8:
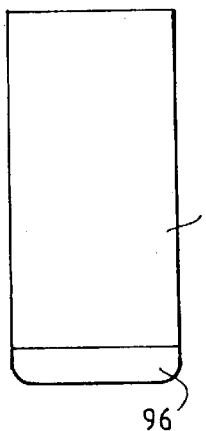
FIGS. 8 and 9 illustrate side view and end views, respectively, of tooling that may be used to change the initial cross-sectional area profile of a fluid communication channel of the present invention.
Figure 9:
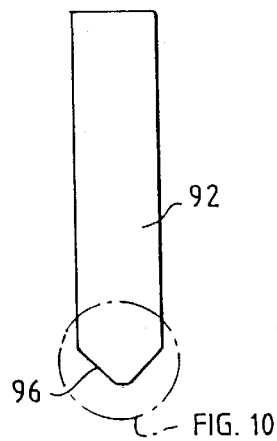
Figure 11:
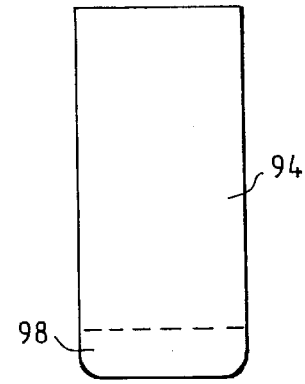
FIGS. 11 and 12 illustrate side view and end views, respectively, of other tooling that may also be used to change the initial cross-sectional area profile of a fluid communication channel of the present invention.
Figure 12:
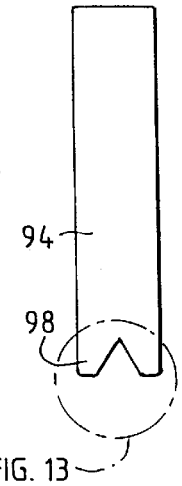
Figure 10:
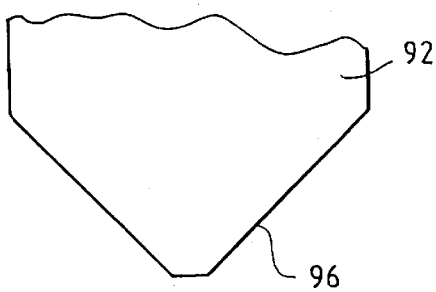
FIG. 10 is an enlarged view of the tooling of FIGS. 8 and 9 taken on line 10 of FIG. 9.
Figure 13:
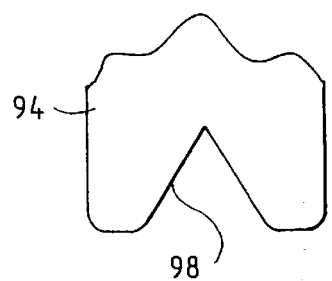
FIG. 13 is an enlarged view of the tooling of FIGS. 11 and 12, taken on line 13 in FIG. 12.

More specifically, such changing or reduction of the initial channel profile may be done in a variety of ways and is preferably done before the caps 58 and 62 are connected with the ends 54 and 56, respectively, of the cylinder 32. One way of doing this is to use a conventional die stamping operation. In this regard, the cylinder 32 is placed on an internal cylindrical mandril not shown. The cylinder and the mandril are braced so as to prevent displacement of the mandril during a channel profile change. The change may be accomplished by pressing a conventional, properly sized stamping tool against the cylinder's outer face, adjacent to the channel portion to be changed, with the force of the tool being radially aligned with and opposed to the channel portion. Examples of the tools that may be used for this purpose are a tool 92, shown in FIGS. 8–10, and a tool 94, shown in FIGS. 11–13. As illustrated, the tool 92 has a generally "V" shaped metal engaging end 96, and the tool 94 has a generally "W" shaped metal engaging end 98.

Figure 14:
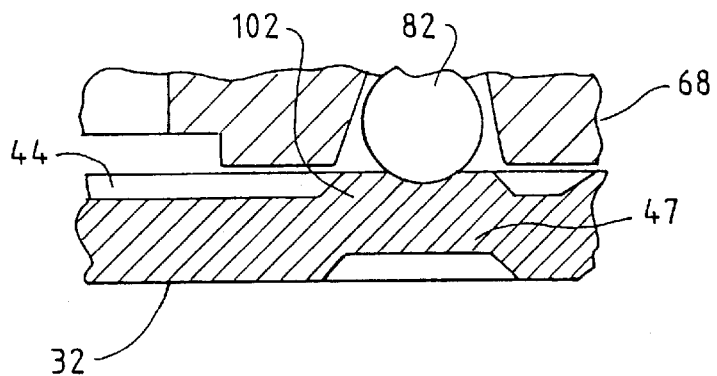
FIG. 14 is an enlarged view of the portion of the channel taken on line 14 in FIG. 7.
Figure 15:
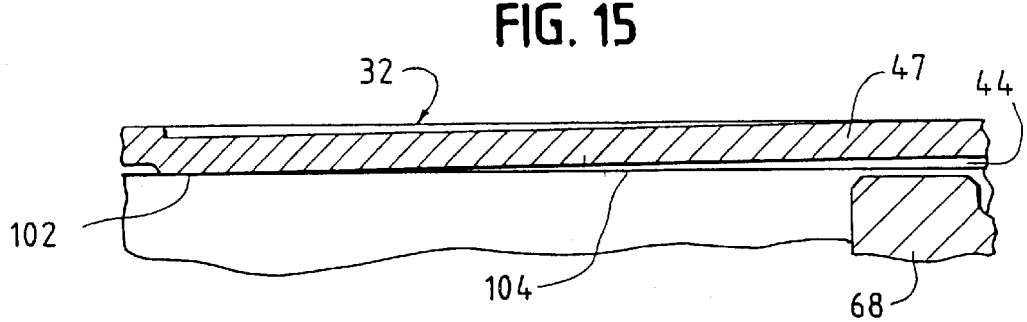
FIG. 15 is an enlarged view of the portion of the channel taken on line 15 in FIG. 7.
Figure 16:
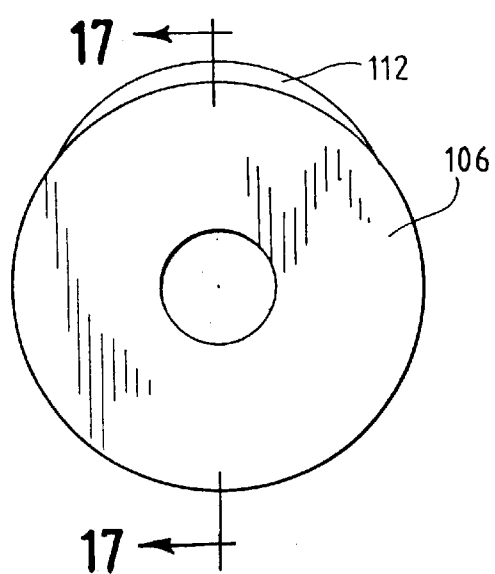
FIG. 16 is a side view of the cam wheel tooling that may be used to change the initial cross-sectional area;profile of a channel portion in accordance with the present invention.
Figure 17:
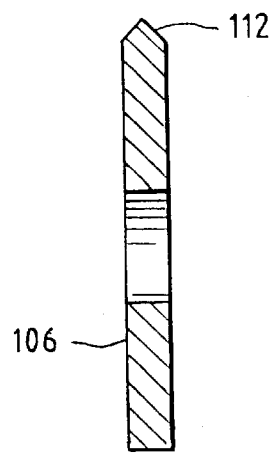
FIG. 17 is an enlarged cross-sectional view taken on line 17—17 in FIG. 16.
Figure 18:
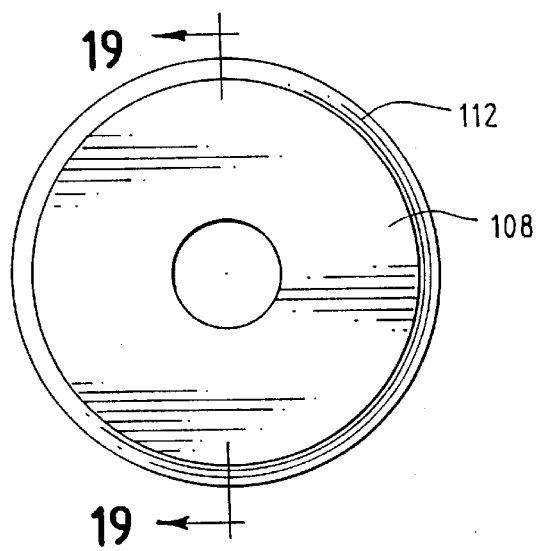
FIG. 18 illustrates a side view of another cam wheel tooling that may be used to change the initial cross-sectional area profile of a channel portion in accordance with the present invention.
Figure 19:
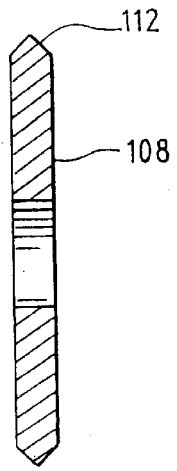
FIG. 19 is an enlarged cross-sectional view taken on line 19—19 in FIG. 18.

By using tools, like tools 92 and 94, and conventional die stamping equipment, the cylinder wall 47, adjacent to the channel portion, is cold formed against the internal cylindrical mandril so as to effectively cause the profile of the channel portion to be reduced or completely closed. The degree of reduction may be controlled using a set of travel-limiting shims. For instance, if no shims are used, the tool will cold form the channel portion to a line-to-line condition with the mandril, and thus completely close the profile of the channel portion. FIG. 14 shows a channel portion 102 whose profile has been reduced to approaching zero or "exhausted." If a shim, or series of shims, are used, the tooling will have a reduced travel thus leaving a reduced but not fully closed channel portion profile relative to the degree of reduced die travel. This allows the predetermined channel portion profile to be predeterminatively adjusted to provide varying levels of restriction to gas flow and provide control of damping during the stroke(s) of the gas spring. FIG. 15 shows a channel portion 104 whose profile has been reduced so as to provide controlled damping preceding a "stop" of the piston assembly 68.

Other ways to change the profile of a channel portion maybe employed. These other ways may use the same or similar cylindrical mandril and backup plate, but employ conventional cold-forming cam wheel tooling, including rolling "V" edged wheels or rollers, cam follower bearings, and linear cams which define the degree and location of displacement of the wheels or rollers. This other way would be the most likely choice for high volume, mass production as it would allow rapid and repeatable cold flowing of the preselected channel portion(s) and would allow ramping of the channel along its length. This other way could be used to produce multiple piston assembly "decelerations" and "stops" along the travel of the assembly 68 at the will of a gas spring designer. In other words, while the tools 92 and 94 could do this same task, it would be somewhat expensively prohibitive to use them in mass production. The other way, while requiring more dedicated tooling and cost, would be the more effective and efficient choice for mass production.

Figure 20:
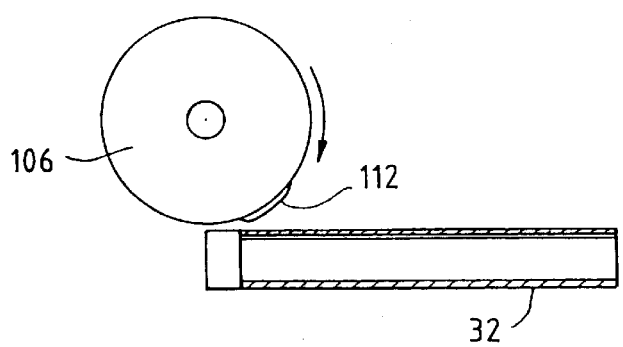
FIGS. 20–22 illustrates a way of using the cam wheel tooling of FIG. 16 to change the initial cross-sectional area profile of a channel portion in accordance with the present invention.
Figure 21:
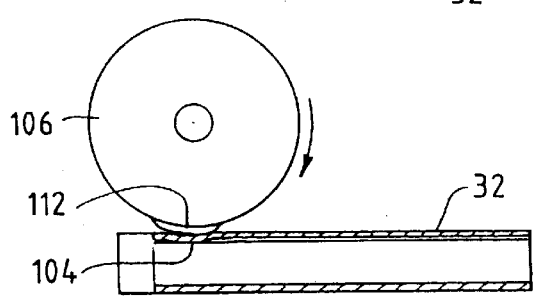
Figure 22:
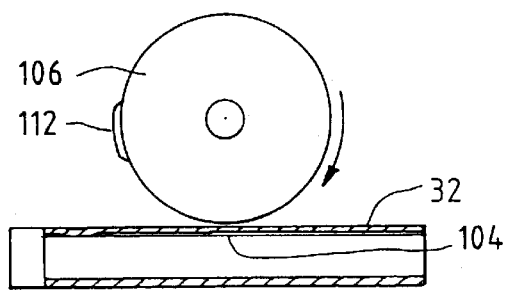

FIGS. 16 and 17 and FIGS. 18 and 19 show illustrative conventional cam wheels or roller tooling 106 and 108, respectively, that may be used to move the material of the cylinder wall 47, adjacent to the preselected channel portions, in accordance with the present invention. The cam wheel 106 includes one cam 112 while the cam wheel 108 include a continuous camming surface whose radial dimensions may vary about the periphery of the wheel. FIGS. 20–22 illustrate how the cam wheel tooling 106 may be used to change the initial cross-sectional area profiles of a selected channel portion, corresponding, for example, to the portion 104. The roller cam tooling 108 may be used with a conventional linear cam (not shown), which has a profiled guide surface, to change the profile of a channel portion(s) on a cylinder 32 supported by an internal cylindrical mandril.

As previously noted, normally the changing of the channel profile is done before the end caps 58 and 62 are connected with the cylinder 32. The circularity of the inner face of the cylinder 32 is maintained throughout the channel profile change through the use of an appropriately sized mandril plates and other fixtures (not shown) that constrains the cylinder wall 47 from deforming outside the specified pre-selected portions of the channel. As also previously stated, the cross-sectional area profile of several portions of the fluid communication channel 44 may be changed. Again the location and number of reduced profile portions are determined by the gas spring designer in view of the specific application of the particular gas spring.

In sum, the initial profile of the fluid communication channel 44 may be changed in preselected portions of its length and in various locations to varying depths. The cross-sectional area profile of the channel determines the rate at which gas or fluid may bypass around or across the piston assembly 68 as the assembly 68 moves, axially, as for example, during its extension stroke, within the cavity 72. Thus, when a cross-sectional area profile of a channel portion is changed to create a smaller profile, the extending velocity of the piston assembly 68, and thus of the shaft 86 is correspondingly, proportionally reduced.

As the cross-sectional area profile of a selected channel portion (for instance, portion 102) is reduced to approaching zero, the velocity of the piston assembly and shaft also begins to approach zero in that channel portion. In other words, the channel portion 102 is changed, as shown in FIG. 14, so as to become essentially round and so as to permit no further bypassing of gas around or across the assembly 68 through the channel when the assembly 68 is adjacent to that channel portion. When in such a position, the piston assembly 68 and the inner face of this channel portion create a positive and secure hydraulic "lock". Including such a channel portion, like the portion 102, in a gas spring is desirable, for example, where auto manufacturer wishes to stop the lifting of the gate or lid at less than its full extended position so that persons, who are relatively short, may easily reach the hatch or lid.

To move the piston assembly beyond or away from this "lock", an external force must be applied to the shaft 86. More specifically, when the shaft 86 is forced to extend further (for instance by a pulling force on the gas spring shaft), the piston assembly 68, including the sealing ring 82, is pulled beyond the portion 102 so the assembly 68 again is adjacent channel portion(s) having a cross-sectional area profile sufficient to permit communication of gas across the piston assembly. The force required to pull the piston assembly 68 away from the portion 102 is a function of: the length of the portion 102; the net effect of force of the gas spring on the application, and the proportion of gas volume in the chamber 74 versus that in the chamber 76.

When such a portion 102 is employed with the gas spring, the piston assembly should include a shuttle seal ring 82 that is made from a material that may have some predictable amount of extrusion potential when a differential pressure is applied across it. In this regard, the piston shuttling sealing ring 82 should provide an absolute seal in the rounded portion 102 as the micro-extrusion, induced by the differential pressure needs to create a "robust" seal over any minor imperfections in the circularity of the portion 102. Examples of such materials would include an elastomeric material, rubber, TPE, etc.

As also noted, the cylinder 32 may include both a rounded portion 102, and portion or portions, like the portion 104, where the cross-sectional area of profile of the channel is reduced relative to the cross-sectional area of profile of the adjacent portions. In such instances, the piston assembly would need to provide an absolute seal around the ID of the cylinder, and in addition, would need to have a minimum amount of extrusion potential into the channel, e.g. a thin layer of rubber molded around a rigid insert. To facilitate. and promote long life of the gas spring, the shuttling seal ring 82 should also be manufactured from a material that will resist extrusion when differential pressures are applied across it. For example, such materials includes filled Teflon, high temperature plastic, graphite ring, etc.

Although the present invention has been described in connection with the manufacture of gas springs, it should be understood that the present invention could also be utilized in the manufacture of shock absorbers, struts, and other similar piston cylinder force inducing, force absorbing devices. Additionally, while the gas spring cylinder has been described as having a single fluid communication channel, more than one such channel could be utilized in a gas spring cylinder.

Further, the so called initial cross-sectional area profile of the channel 44 may not be the profile that the channel had when the channel was originally made, that is, when the cylinder 32 was being made. For instance, through the use of a cam, like the cam 108, the original channel profile might be uniformly or substantially uniformly changed or reduced before the profile(s) of preselected portion(s), are changed. In other words, the present invention is also applicable where the original cross-sectional area profile of the channel 44 may be uniformly or substantially uniformly changed during an intermediate step and before further additional changes are made to the initial profile(s) of predetermined channel portions to afford the gas spring its preselected operating characteristics.

What is claimed is:

1. In a method of manufacturing a gas spring where the gas spring comprises: a cylinder that has first and second ends, that has a longitudinal central axis extending between the first and second ends of the cylinder, and that has an outer face and an inner face which defines a fluid receiving tubular cavity within the cylinder; a piston assembly that is disposed within the tubular cavity, that includes an axially disposed shaft which projects from the first end of the cylinder, that is reciprocally, axially moveable within the tubular cavity during an extension stroke and during a compression stroke, that has a sealing ring which provides a seal between the piston assembly and the inner face of the cylinder, and that defines a first working chamber and a second working chamber in the tubular cavity; a first end cap that closes the first end of the cylinder and that includes a seal between the reciprocally moveable shaft and the first end cap; and a second end cap that closes the second end of the cylinder, the improvement comprising the steps of:

making a fluid communication channel in the inner face of the cylinder, where the fluid communication channel has an initial, predetermined cross-sectional area profile, is open to the tubular cavity and extends axially in the inner face so that the fluid communication channel may provide a path for the flow of fluid between the first and second working chambers and for bypassing around or across the piston assembly as the piston assembly reciprocally moves within the tubular cavity; and changing selectively the initial cross-sectional area profile of at least a portion of the fluid communication channel so that the rate of flow of fluid through the fluid communication channel and bypassed around or across the piston assembly, when the piston assembly is adjacent to the channel portion, is selectively changed as compared to the rates of flow of fluid through the fluid communication channel and bypassed around or across the piston assembly when the piston assembly is adjacent to the other channel portions that have different cross-section areas profiles.

2. The improved method of claim 1 where the fluid communication channel is made as the cylinder is being made.

3. The improved method of claim 1 where the fluid communication channel is made so as to extend continuously between the first and second ends of the cylinder; and where the initial cross-sectional area profile of the fluid communication channel is substantially the same throughout the fluid communication channel.

4. The improved method of claim 1 where the initial cross-sectional area profile of more than one portion of the fluid communication channel is selectively changed.

5. The improved method of claim 1 where channel making means are used to make the fluid communication channel.

6. The improved method of claim 1 where changing the initial cross-sectional area profile of the channel portion includes the step of exerting selective forces on the outer face of the cylinder, adjacent to the channel portion, so as to reduce the initial cross-sectional area profile of the channel portion relative to the initial cross-sectional area profiles of other portions of the fluid communication channel.

7. The improved method of claim 1 where the initial cross-sectional area profile of the channel portion is reduced to approaching zero so that fluid is prevented from flowing through the channel portion and bypass around or across the piston assembly when the piston assembly is disposed adjacent to the channel portion.

8. The improved method of claim 7 where channel making means are used to make the fluid communication channel.

9. The improved method of claim 8 where changing the initial cross-sectional area profile of the channel portion includes the step of using the channel making means to exert selective forces on the outer face of the cylinder, adjacent to the channel portion so as to reduce the cross-sectional area profile of the channel portion relative to the initial cross-sectional area profiles of other portions of the fluid communication channel.

10. The improved method of claim 9 where the initial cross-sectional area profile of more than one portion of the fluid communication channel is selectively changed.

11. The improved method of claim 10 where the initial cross-sectional area profile of a second channel portion is reduced, relative to the cross-sectional area profile of other, adjacent channel portions, so that fluid flow through the fluid communication channel and bypassed around or across the piston assembly is restricted through the second channel portion, relative to the fluid flow through the adjacent channel portions, when the piston assembly is adjacent to the second channel portion.

12. The improved method of claim 11 where the second channel portion is located adjacent to where the piston assembly is disposed at the end of the extension stroke of the piston assembly so that the fluid flow restriction, caused by the reduced cross-sectional area profile of the second channel portion, tends to decelerate the movement of the piston assembly as the piston assembly approaches the end of the extension stroke.

13. The improved method of claim 12 where the fluid communication channel is made to extend continuously from first end to the second end of the cylinder; and where the initial cross-sectional area profile of the fluid communication channel is substantially the same throughout the length of the fluid communication channel.

14. The improved method of claim 13 where the fluid communication channel is made as the cylinder is being made.

15. The improved method of claim 8 where the fluid communication channel is made to extend continuously from first end to the second end of the cylinder; and where the initial cross-sectional area profile of the fluid communication channel is substantially the same throughout the length of the fluid communication channel.

16. The improved method of claim 15 where the fluid communication channel is made as the cylinder is made.

17. The improved method of claim 1 where the initial cross-sectional area profile of the channel portion is reduced, relative to the cross-sectional area profiles of adjacent, other, channel portions, so that fluid flow through the fluid communication channel and bypassing around or across the piston assembly is restricted through the channel portion, relative to the fluid flow through the adjacent, other channel portion, when the piston assembly is adjacent to the channel portion.

18. The improved method of claim 17 where the channel portion is located adjacent to where the piston assembly is disposed at the end of the extension stroke of the piston assembly so that the fluid flow restriction, caused by the reduced cross-sectional area profile of the channel portion, tends to decelerate the movement of the piston assembly as the piston assembly approaches the end of the extension stroke.

19. The improved method of claim 18 where channel making means are used to make the fluid communication channel.

20. The improved method of claim 19 where changing the initial cross-sectional area profile of the channel portion includes the step of using the channel making means to exert selective forces on the outer face of the cylinder, adjacent to the channel portion, so as to reduce the cross-sectional area profile of the channel portion relative to the cross-sectional area profiles of adjacent, other portions of the channel.

21. The improved method of claim 20 where the fluid communication channel is made to extend continuously from first end to the second end of the cylinder; and where the initial cross-sectional area profile of the fluid communication channel is substantially the same throughout the length of the fluid communication channel.

22. The improved method of claim 21 where the fluid communication channel is made as the cylinder is being made.

* * * * *